US011150930B2

(12) United States Patent
Gupta et al.

(10) Patent No.: US 11,150,930 B2
(45) Date of Patent: Oct. 19, 2021

(54) AUTONOMIC MANAGEMENT OF MULTI-SITE CLOUD INFRASTRUCTURE

(71) Applicant: VMware, Inc., Palo Alto, CA (US)

(72) Inventors: Vishal Gupta, Milpitas, CA (US);
Nikhil Ayyagari, Palo Alto, CA (US);
Thayumanavan Sridhar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 276 days.

(21) Appl. No.: 16/022,583

(22) Filed: Jun. 28, 2018

(65) Prior Publication Data
US 2020/0004569 A1 Jan. 2, 2020

(51) Int. Cl.
*G06F 9/455* (2018.01)
*H04L 29/08* (2006.01)
*G06Q 10/06* (2012.01)

(52) U.S. Cl.
CPC ... *G06F 9/45558* (2013.01); *G06Q 10/06312* (2013.01); *H04L 67/1029* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS 7,434,105 B1 * 10/2008 Rodriguez-Rivera ........ G06F 11/073
714/38.1
9,128,899 B1 * 9/2015 McAlister ............ G06F 11/203

OTHER PUBLICATIONS

Amazon. AWS Auto Scaling Groups. aws.amazon.com/autoscaling.
Google. Kubernetes Cluster Federation. kubernetes.io/docs/concepts/cluster-administration/federation/.
T. Guo. Seagull: Intelligent cloud bursting for enterprise applications. ATC'12. USENIX, 2012.
M. Unuvar. C-Ports: Docker containers across multiple clouds and datacenters.
M. Unuvar. Hybrid cloud placement algorithm. Mascots. IEEE, 2014.
U.S. Appl. No. 13/760,868, filed Feb. 6, 2013.
U.S. Appl. No. 14/798,483, filed Jul. 14, 2015.

* cited by examiner

*Primary Examiner* — Eric C Wai
(74) *Attorney, Agent, or Firm* — Patterson + Sheridan, LLP

(57) ABSTRACT

The disclosure provides an approach for managing an application workload on a computer system that includes data centers. The application workload includes first application instances running on a first data center and second application instances running on a second data center. The method comprises collecting usage data of first application instances, usage data of second application instances, and combining the collected data. The method further comprises evaluating the combined data to determine low health in least one application instance, and restarting the at least one application instance or creating a new application instance. The method further comprises evaluating the combined data to determine whether to change size of the application workload, and in which data center to place a second new application instance if increasing size. The method further comprises contacting a component of the chosen data center to place the second new application instance within a local host machine.

17 Claims, 4 Drawing Sheets

AUTONOMIC MANAGEMENT OF MULTI-SITE CLOUD INFRASTRUCTURE

BACKGROUND

Many organizations have more than one data center to support the organization's operations. To manage the multiple data centers, organizations sometimes effectively combine the data centers and manage them as one data center. Problems may arise with this approach. For example, because the individual data centers cannot operate independently, if the centralized control plane fails, the individual data centers become inoperable. Also, as the number of data centers grows, management of all data centers as one data center becomes complex.

SUMMARY

A method described herein provides for managing an application workload on a computer system, the computer system comprising a plurality of data centers that includes a first data center and a second data center, the workload comprising a plurality of application instances, the plurality of application instances comprising first application instances running on the first data center and second application instances running on the second data center, the method comprising collecting first data of the workload from the first data center and storing the first data on storage of the first data center, wherein the first data comprises usage data of first application instances. The method further comprises collecting second data of the workload from the second data center and storing the second data on storage of the second data center, wherein the second data comprises usage data of second application instances, combining the first data and second data into combined data. The method further comprises evaluating the combined data to determine presence of a low health indicator in least one instance of the plurality of application instances, responsive to determining presence of the low health indicator, restarting the at least one instance or creating a first new application instance to replace the at least one instance, evaluating the combined data to determine whether to increase or decrease a size of the application workload, and determining whether to increase or decrease the size of the application workload, responsive to a determination to increase or decrease the size of the application workload, determining in which of the plurality of data centers of the computer system to place a second new application instance, and upon determining a chosen data center from among the plurality of data centers, contacting a component local to the chosen data center to place the second new application instance within a host machine of the chosen data center.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides techniques for managing workloads in a plurality of data centers. The management is separated into two tiers, a higher "federated" tier in which a data center is chosen for an operation on a workload, and a lower "localized" tier in which a host and virtual computing instance are chosen for the operation on the workload. Through this division, a computer system is able to contain self-managing data centers, but to guide the management of those self-managing data centers from a central location. Each data center continues to operate as an independent autonomous entity, oblivious to other data centers, but each data center is managed by a higher control plane.

The techniques provide a number of advantages over the prior art. The "federated," "decoupled," or "hierarchical" approach to managing workloads offers advantages over a "monolithic" approach to data center management. In the monolithic approach, multiple data centers are centrally managed as a single data center. The techniques of the present disclosure do not have a single point of failure, provide for simpler and superior scalability, and provide for more flexibility in managing and developing the modular data centers.

Figure 1A:
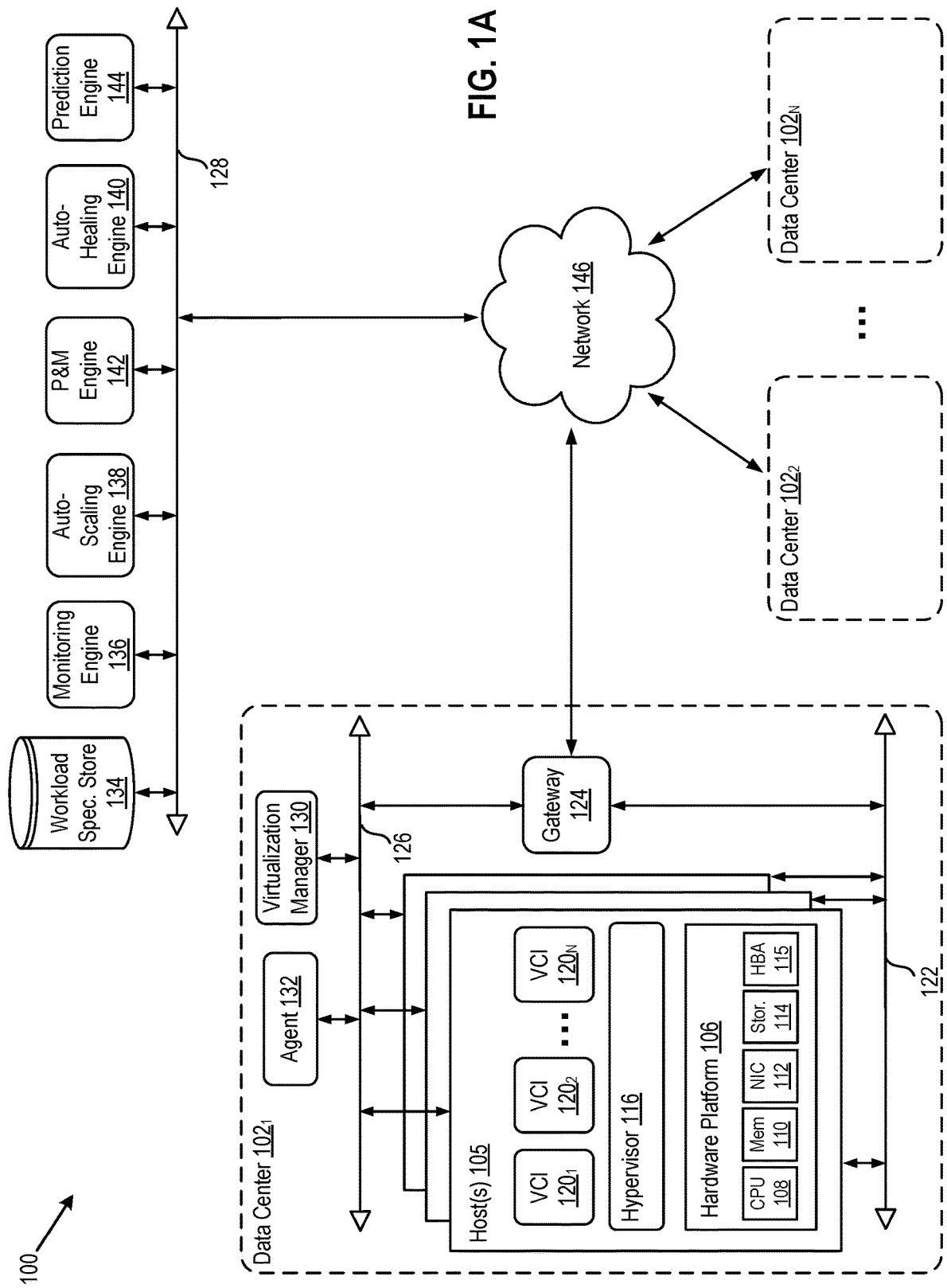
FIG. 1A depicts a block diagram of a computer system in which one or more embodiments of the present disclosure may be utilized.

FIG. 1A depicts a block diagram of a computer system 100 in which one or more embodiments of the present disclosure may be utilized. Computer system 100 includes a plurality of data centers $102_1$ to $102_N$ (collectively referred to as data centers 102 and individually referred to as data center 102) and a control network 128, which are connected by network 146. Each data center 102 may be an on-premise data center or a cloud data center. Each data center 102 may be a software-defined data center (SDDC). Network 140 may be, for example, a direct link, a local area network (LAN), a wide area network (WAN) such as the Internet, another type of network, or a combination of these.

Data center 102 includes host(s) 105, a virtualization manager 130, and agent 132, a gateway 124, a management network 126, and a data network 122. Although the management and data network are shown as separate physical networks, it is also possible in some implementations to logically isolate the management network from the data network using different virtual local area network (VLAN) identifiers. Each of hosts 105 may be constructed on a server grade hardware platform 106, such as an x86 architecture platform. For example, hosts 105 may be geographically co-located servers on the same rack or on different racks in any arbitrary location in datacenter 102.

Host 105 is configured to provide a virtualization layer, also referred to as a hypervisor 116, that abstracts processor, memory, storage, and networking resources of hardware platform 106 into multiple virtual computing instances (VCIs) $120_1$ to $120_N$ (collectively referred to as VCIs 120 and individually referred to as VCI 120) that run concurrently on the same host. As used herein, the term "VCI" may refer to a virtual machine (VM), container, Docker container (see, e.g., www.docker.com), data compute node, isolated user space instance, namespace containers, and the like. In certain embodiments, VCIs 120 may be containers that run on host 105 without the use of a hypervisor. One example of a hypervisor 116 is a VMware ESXi™ hypervisor provided as part of the VMware vSphere® solution made commercially available from VMware, Inc. of Palo Alto, Calif.

Figure 1B:
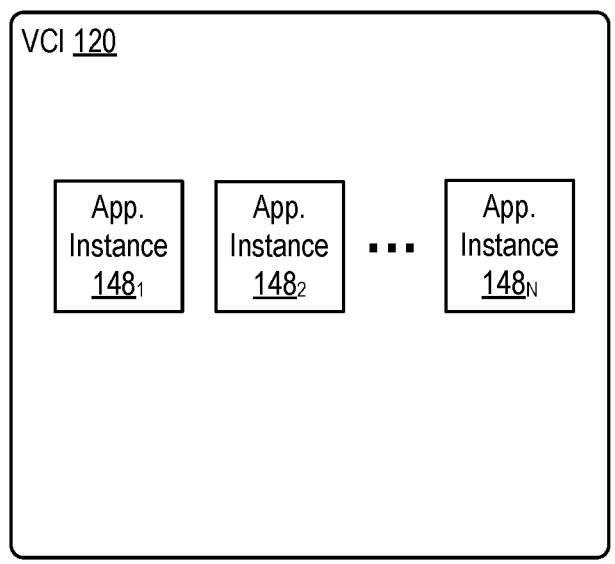
FIG. 1B depicts a block diagram of an expanded view of an exemplary virtual computing instance, according to an embodiment.

FIG. 1B depicts a block diagram of an expanded view of an exemplary VCI 120, according to an embodiment. VCI 120 contains one or more application instances 148. Application instances are running instances of an application. An application might be, for example, Microsoft Word, Adobe Acrobat Reader, Structured Query Language (SQL) Database software, or web server software. Each VCI 120 may contain application instances 148 that are for the same application or for different applications. An application instance 148 may be migrated between VCIs 120 on the same or different host 105, or between VCIs on different data centers 102. In an embodiment, each VCI 120 is a VM, and each VM contains a single application instance 148. In this embodiment, application instances 148 may be migrated between hosts 105 on the same or different data center by migrating VMs, which may be migrated by methods known in the art, such as the method described in U.S. patent application Ser. No. 13/760,868, filed Feb. 6, 2013, or the method described in U.S. patent application Ser. No. 14/798,483, filed Jul. 14, 2015. The entire contents of both of these applications are incorporated by reference herein.

In a second embodiment, each VCI 120 is a VM comprising containers, and each container has a single application instance 148. In a third embodiment, each VCI 120 is a container having a single application instance 148. As is known in the art, containers cannot be "migrated" by transferring a container from one host 105 to another, neither by hot (live) migration nor cold migration. Instead of migration, a container is shut down, the state of the container is saved, a new container is opened in a destination host 105, and the state of the previous container is adopted by the new container. In embodiments in which application instances 148 are executing within containers, when the present disclosure discusses "migration" of VCIs, what is meant is a process of shutting down a container and starting a new container with the same state, as described.

Each application instance 148 belongs to a workload. A workload consists of a set of application instances 148 and a workload specification. In an embodiment, a workload is associated with a single application. That is, all application instances 148 of a workload are instances of the same application (e.g., Microsoft Excel). Workload specifications are stored in a workload specification store 134, as discussed further below. A workload specification may be created by an administrator of computer system 100 or automatically by a managerial software component of computer system 100. An exemplary workload specification is shown in Table 1.

As shown in row two of Table 1, a workload specification includes information such as resource requirements (CPU, memory, storage, etc.) of each application instance 148 of that workload. As shown in row three, a workload specification may specify the number of application instances 148 required for an application to be properly and efficiently available to users of that application within computer system 100. For example, if an application is highly demanded and frequently used, the workload for that application may comprise a larger number of running application instances 148 than a workload for an application that is infrequently used by users of computer system 100. The number of application instances 148 may be determined by an administrator, or may be automatically computed a component of computer system 100.

Row four of Table 1 shows that the affinity of an application instance 148 to a set of data centers 102 can be specified within the workload specification of that application instance 148. For example, the affinity of application instance $148_1$ may be set to STRONG in relation to data center $102_1$, meaning that application instance $148_1$ should be kept within data center $102_1$, except in extreme circumstances. Or for example, the affinity of application instance $148_1$ may be set to WEAK in relation to a set of data centers consisting of data center $102_1$ and data center $102_2$, meaning that application instance $148_1$ should preferably be kept within one of data centers $102_1$ or $102_2$, but other data centers 102 would be almost equally satisfactory.

Row five of Table 1 shows the "split strategy" parameter of a workload. This parameter can be used to keep application instances 148 of a workload confined to one of data centers 102 or to a set of data centers 102. For example, the workload specification of application instances 148 may specify that these application instances may be on any data center 102, but they must all be on the same data center 102. Or, the workload specification may specify that application instances 148 of a workload may be located on any data center 102, or on one of a set of data centers 102.

Row six of Table 1 shows the "migratability" parameter, which sets permission as to whether an application instance 148 of a workload may be migrated to another data center 102 after initial placement. Row seven of Table 1 shows the "scalability" parameter, which sets a minimum and/or maximum size of a workload, as measured in, for example, megabytes of a workload or number of application instances 148 of a workload.

TABLE 1

| Name | Description |
| --- | --- |
| Resources | Example: CPU, storage, and memory requirements of each application instance |
| No. of Instances | Desired/target count of application instances |
| Data Center Affinity | STRONG, MEDIUM, or WEAK affinity of an application instance to a specific set of data centers |
| Split Strategy | CONFINE application instances to a data center, or SPREAD application instances to a set of data centers |
| Migratability | Sets permission on whether application instances may be migrated |
| Scaling Limits | Sets a minimum and maximum size of workload, such as in number of application instances or megabytes |

Returning to FIG. 1A, hypervisor architecture varies. Hypervisor 116 may run on top of an operating system in host 105 or directly on hardware platform 106 of host 105. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine.

Hardware platform 106 of each host 105 includes components of a computing device such as one or more processors (CPUs) 108, system memory 110, a network interface 112, storage system 114, a host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interface 112 enables host 105 to communicate with other devices via a communication medium, such as data network 122 and/or management network 126. Network interface 112 may include one or more network adapters or ports, also referred to as Network Interface Cards (NICs), for connecting to one or more physical networks. In certain embodiments, data network 122 and management network 126 may be different physical networks as shown, and the hosts 105 may be connected to each of the data network 122 and management network 126 via separate NICs or separate ports on the same NIC. In certain embodiments, data network 122 and management network 126 may correspond to the same physical network, but different network segments, such as different subnets or different logical VLAN segments.

Storage system 114 represents persistent storage devices (e.g., one or more hard disks, flash memory modules, solid state disks, and/or optical disks). Host bus adapter (HBA) 115 couples host 105 to one or more external storages (not shown), such as a storage area network (SAN) or distributed virtual SAN. Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory.

Gateway 124 provides VCIs 120 and other components in data center 102 with connectivity to network 146. Gateway 124 may manage external public IP addresses for VCIs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Gateway 124 may be a virtual computing instance, a physical device, or a software module running within host 105.

Data center 102 includes a management component, depicted in FIG. 1 as a virtualization manager 130, that communicates to the one or more hosts 105 via management network 126. In an embodiment, virtualization manager 130 is a computer program that executes in a central server in data center 102, or alternatively, virtualization manager 130 runs in one of VCIs 120. Virtualization manager 130 is configured to carry out administrative tasks for data center 102, including managing hosts 105, managing VCIs 120 running within each host 105, provisioning VCIs 120, transferring VCIs 120 from one host to another host, transferring VCIs 120 between data centers 102, transferring application instances 148 between VCI 120 or between hosts 105, and load balancing between hosts 105 within data center 102.

Virtualization manager 130 may obtain data from agent 132 on nodes within data center 102 so as to dynamically load balance VCIs between hosts 104 of data center 102. Virtualization manager 130 may also use a static load balancing algorithm, such as a round robin, weighted round robin, blue-green, or a hash based algorithm. Virtualization manager takes commands from components located on control network 128 as to creation, migration, and deletion decisions of VCIs 120 and application instances 148 on data center 102 of virtualization manager 130. However, virtualization manager 130 also makes independent decisions on management of local VCIs 120 and application instances 148, such as placement of VCIs 120 and application instances 148 between hosts 105. One example of virtualization manager 130 is the vCenter Server™ product available from VMware, Inc. Virtualization manager 130 may also be the Distributed Resource Scheduler (DRS)™ product available from VMware, Inc, or a combination of these two products.

Data center 102 includes an agent 132. Agent 132 collects data from nodes of its data center 102. A "node" includes a VCI 120, a host 105, and an application instance 148. Data collection by agent 132 may occur continuously or periodically, the period being for example, every second, every minute, every ten minutes, or every hour. Agent 132 collects data on local application instances 148 within its data center 102. As used herein, the term "local" means that the components discussed are within the same data center 102.

Agent 132 is an "agent" of monitoring engine 136, and provides the collected data to monitoring engine 136. Monitoring agent 136 then provides data collected by all agents 132 of computer system 100 to auto-scaling engine 138, auto-healing engine 140, placement and migration engine 142, and prediction engine 144. In an embodiment, agent 132 also provides collected data to virtualization manager 130. The data collected on application instances 148 by each agent 132 includes usage data and health information. Subsequently, the collected data on application instances 148 may be used to manage workloads of the application instances 148.

For example, if certain application instances 148 have low usage by users of computer system 100, then those application instances 148 may be deleted to free resources. Application instances may be deleted from data center 102 or created on data center 102 by a decision of auto-scaling engine 138. Auto-scaling engine then contacts placement and migration engine 142, which chooses a data center 102 on which application instance(s) 148 is to be created or deleted, or from which application instance(s) 148 are to be migrated. Placement and migration engine 142 then contacts virtualization manager 130 to delete or create application instance(s) 148 on the data center 102 local to virtualization manager 130. Placement and migration engine 142 also contacts virtualization manager 130 to migrate application instance 148 from that data center to another data center, if migration is needed. Host-level decisions may be made by virtualization manager 130. For example, if host 105 is overloaded, virtualization manager 130 may decide to migrate VCI 120 or application instance 105 to another host 105 within its local, same data center 102.

For another example of use of collected data, if certain application instances 148 have low health indicators, then those application instances may be shut down and restarted. Low health indicators may include unresponsiveness to protocol calls when requested through IP and port number combination of application instance 148. Application instances may be shut down and recreated for low health reasons by a decision of auto-healing engine 140, which then contacts virtualization manager 130 to perform a restart operation on application instance 148 local to virtualization manager 130.

Agent 132 also collects data on local hosts 105 and VCIs 120. Data collected on hosts 105 and VCIs 120 includes available resources of each host 105 and VCI 120. The data informs decisions as to whether VCI 120 and/or host 105 are able to host additional application instances 148, or whether VCI 120 and/or host 105 are overloaded and should have some of their applications instances 148 migrated out. Decisions as to whether application instance 148 should be migrated is made by placement and migration engine 142, which contacts virtualization manager 130 to perform migration of an application instance local to the virtualization manager 130.

Computer system 100 includes control network 128. Control network 128 has components that manage data centers 102. Control network 128 may be one of management networks 126 located within one of data centers 102, or control network 128 may be a separate network within one of data centers 102 or outside of data centers 102. Components on control network 128 include workload specification store 134, monitoring engine 136, auto-scaling engine 138, placement and migration engine 142, auto-healing engine 140, and prediction engine 144. Software components of control network 128 may run as or on VCIs 120 within one of data centers 102, as independent software modules within one of data centers 102, or as hardware devices within computer system 100.

Software components on control network 128 obtain data from each agent 132 on each data center 102. The software components then use the data on each data center 102 to make data-center-level decisions, such as to move certain application instances 148 from one data center 102 to another, or to create more application instances 148 within one of data centers 102 rather than on another data center 102. After data center 102 is chosen by a component of control network 128, then the decision is passed to virtualization manager 130 of the chosen data center 102. Virtualization manager 130 then makes localized decisions, such as which specific host 105 will host the new application instance(s) 148, and/or which VCI 120 will host the new application instance(s) 148.

By separating management decisions of data centers 102 into two steps—a higher "federated" step whose decisions are between data centers 102, and a lower "localized" step who decisions are between nodes within the data center 102 chosen at the first step—computer system 100 is able to contain self-managing data centers 102, but whose self-management is guided by a higher level controller. Each data center 102 continues to operate as an independent autonomous entity, oblivious to other data centers 102, but each data center 102 is managed by a higher control plane.

Such a "federated," "decoupled," or "hierarchical" approach offers advantages over the "monolithic" approach to data center management of the prior art, in which multiple data centers 102 are centrally managed as a single data center. The present decoupled approach does not have a single point of failure and so provides for better failure isolation. The decoupled approach provides for simpler and superior scalability, because virtualization manager 130 of each underlying data center 102 can independently manage a subset of infrastructure of computer system 100. The decoupled approach offers more flexibility in managing multiple data centers 102 of computer system 100, because each data center 102 can use its own policies for managing the infrastructure independent of other data centers 102. The decoupled approach is more modular than a monolithic approach, which allows for a simpler and superior approach to software and hardware development of computer system 100.

As shown in FIG. 1A, components on control network 128 include workload specification store 134, monitoring engine 136, auto-scaling engine 138, placement and migration engine 142, auto-healing engine 140, and prediction engine 144. Workload specification store 134 contains workload specifications (see Table 1, above) for each application workload executing on computer system 100. Workload specification store 134 may be one of storages 114 on host 105 within one of data centers 102, or specification store 134 may be a separate storage device located within or outside of data center 102.

Monitoring engine 136 combines data collected by each agent 132 of each data center 102 of computer system 100. Monitoring engine 136 collects data from each agent 132 continuously or periodically, the period being for example, the same period at which agent 132 collects its local node data. By combining data of each agent 132, monitoring engine 136 possesses data on each data center 102 of computer system 100. Monitoring engine 136 passes this data to other components on control network 128, allowing those components to make data-center-level decisions regarding management of multiple data centers 102. The data collected by monitoring engine 136 includes the number of application instances 148 in each data center 102 organized by application workload, whether each application instance 148 is healthy, the usage of each application instance 148, the resources used by and available to each VCI 120, and the resources available on each host 105.

Auto-scaling engine 138 obtains data from monitoring engine 136 so as to scale application instances 148. Auto-scaling engine 138 maintains the target number of application instances 148 within computer system 100. The target number may be explicitly defined within a workload specification (see Table 1) by a user, an administrator, or a software component. Or, the target number of application instances 148 may be dynamically determined by auto-scaling engine 138 as per user demand (i.e., usage level data) for application instances 148 of a workload. In an embodiment, auto-scaling engine 138 determines the target number of applications by considering predictions, such as predicted usage-levels of applications instances 148, the predictions being provided by prediction engine 144, as further described below. Auto-scaling engine 138 takes into account workload specifications when scaling, such as the minimum or maximum number of application instances 148 per workload. If auto-scaling engine 138 decides that more application instances 148 are needed for a workload, auto-scaling engine contacts placement and migration engine 142, which makes a decision as to which data center 102 should have a newly created application instance 148 created in it, or which data center 102 should have an existing application instance 148 deleted.

In an embodiment, auto-scaling engine 138 provides the target number of application instances 148 to placement and monitoring agent 142, which then performs placement and migration of application instances 148. In another embodiment, auto-scaling engine 138 provides the target number of application instances 148 to auto-healing engine 140, which then provides guidance to placement and monitoring agent 142. The guidance may be, for example, regarding which application instances 148 to migrate depending on health of each application instance 148 (e.g., no need to migrate unhealthy instances because they may be deleted), and regarding the number of application instances 148 to add or delete in light of the number of unhealthy application instances 148 that may need to be deleted.

Placement and migration (P&M) engine 142 obtains data from monitoring engine 136 to make placement and migration decisions regarding application instances 148. After auto-scaling engine 138 decides to create new application instances 148, placement and migration engine 142 decides as to which data center 102 to place newly created application instances 148 or which data center 102 to place application instances 148 that are about to be created, depending on implementation of placement/creation order. Placement and migration engine 142 decides to which data center 102 to migrate an application instance 148, after the decision to migrate that application instance 148 had been made by auto-scaling engine 138. Placement and migration engine 142 decides at which data center an application instance 148 is to be created or to be migrated according to the placement algorithm described with reference to FIG. 3, below. Placement and migration engine 142 also decides from which data center 102 to delete an application instance 148 after a decision to delete application instance 148 is made by auto-scaling engine 138.

Placement and migration engine 142 executes a placement algorithm (see FIG. 3) for each application instance 148 placed in a data center with weak affinity, so as to determine whether the application instance 148 may be placed in a data center 102 to which the application instance 148 has a higher affinity. Affinity to a data center 102 by an application instance 148 reflects the desired data center 102 on which the application instance is to be placed (see Table 1). Placement and migration engine 142 delegates its creation/deletion/migration decision to virtualization manager 130 of the appropriate data center 102 to carry out the creation/deletion/migration operation on application instance(s) 148.

Auto-healing engine 140 obtains data from monitoring engine 136 to make decisions regarding health of application instances 148, and to make decisions on whether to restore unhealthy application instances 148. Auto-healing engine 140 analyzes data obtained from monitoring engine 136 to find whether indicators of low health of application instance(s) 148 are present. If auto-healing engine 140 determines that any application instance 148 on computer system 100 has low health, auto-healing engine 140 may decide to shut down and restart the low-health application instance(s) 148 by sending a command to virtualization manager 130, which then performs the shut down and restart process. In an embodiment, the shut down and restart process comprises saving the state of an unhealthy application instance 148 148, opening a new application instance 148, and providing the saved state to the new application instance 148.

Prediction engine 144 obtains data from monitoring engine 136 to make predictions regarding workloads on computer system 100. The predictions may be, for example, regarding future demand (i.e., usage by users of computer system 100) of workloads, and prediction engine 144 provides such future demand predictions to auto-scaling engine 138. The prediction may be, for example, regarding health of application instances 148, and prediction engine 144 provides such future health predictions to auto-healing engine 140. Health predictions may be, for example, predictions of future failures of application instances 148, such as probability of failures by certain application instances 148. Prediction engine 144 uses past data obtained from monitoring engine 136, as well as other data, to train a machine learning model. The machine leaning model may be a recurrent neural network (RNN). The RRN may be a long short-term memory (LSTM) RNN. The LSTM RNN may have, for example, one hidden layer and four SLTM cells for the prediction tasks.

Figure 2:
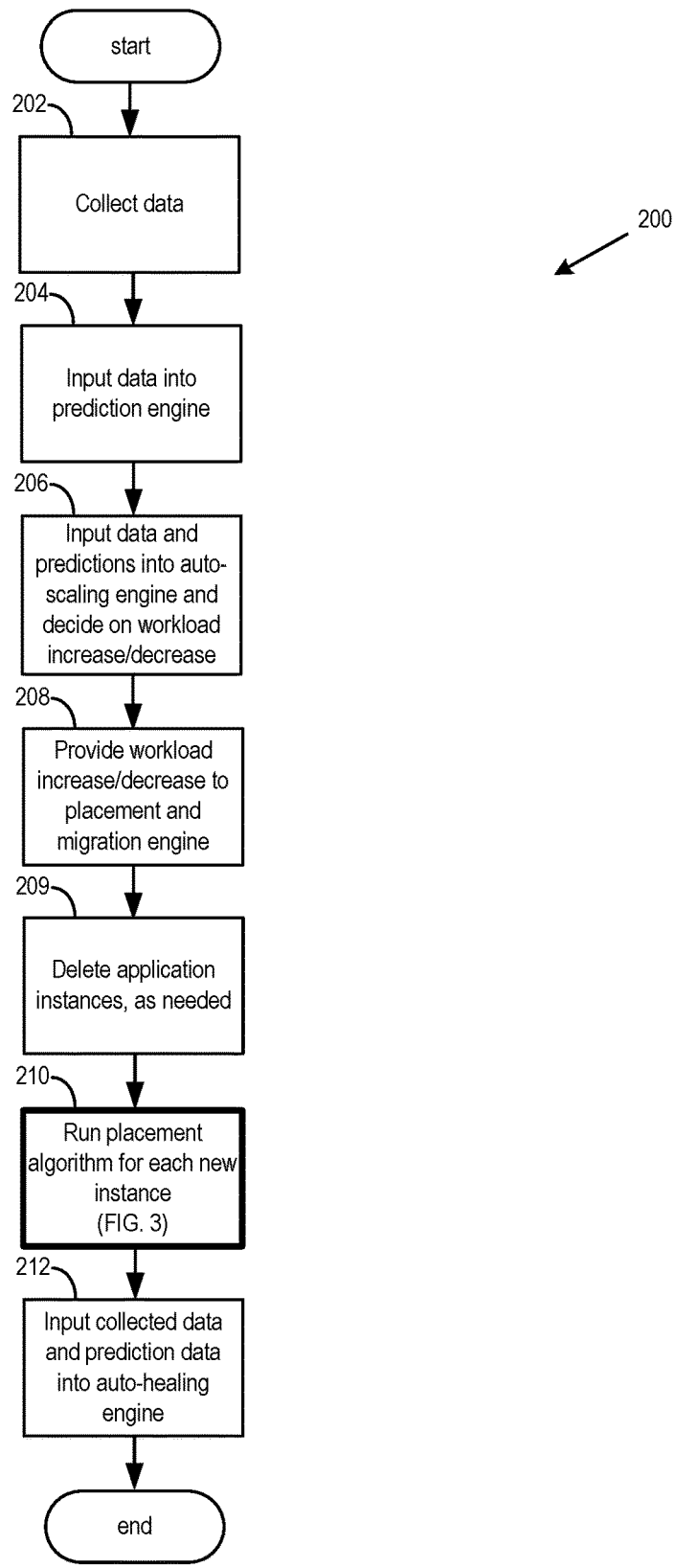
FIG. 2 depicts a flow diagram of a method of managing one or more workloads on a plurality of data centers, according to an embodiment.

FIG. 2 depicts a flow diagram of a method of managing one or more workloads on a plurality of data centers, according to an embodiment. Method 200 is performed by the components on control network 128 (components 134-144) in conjunction with agent 132 and virtualization manager 130. Method 200 is performed periodically, the period being for example, every second, every minute, every ten minutes, or every hour.

At block 202, agent 132 at each data center 102 collects data on application instances 148 of its local data center 102. The data includes usage and health data of application instance 148. Agent 132 at each data center 102 also collects data on hosts 105 and VCIs 120 of its local data center 102, the data including percent utilization and availability of host 105 and VCI 120 resources, including CPU, memory, and storage resources. As part of block 202, each agent 132 of computer system 100 provides the data that agent 132 collected to monitoring engine 136.

At block 204, the combined data obtained by monitoring engine 136 at block 202 is fed into prediction engine 144 as input data. Based on the data collected at block 202, prediction engine 144 creates forecasts and predictions regarding user demand and health of application instances 148 for workloads running on computer system 100.

At block 206, the data collected by monitoring engine 136 at block 202 and the predictions created by prediction engine 144 at block 204 are fed as input data into auto-scaling engine 138. Auto-scaling engine 138 analyzes the current state of workloads (i.e., analyzes current state of application instances 148 of workloads) in computer system 100 by analyzing data provided by monitoring engine 136. For each workload in computer system 100, auto-scaling engine 138 obtains workload parameters, such as the target number of application instances 148 and the minimum/maximum number of application instances, from workload specification store 134. In an embodiment, auto-scaling engine determines the target number of application instances 148 for each workload by references a parameter stated in the workload specification. In a second embodiment, auto-scaling engine 138 dynamically determines the target number of application instances 148 for each workload, based on data provided by monitoring engine 136.

As part of block 206, auto-scaling engine 138 compares the current state of workloads to the target state of workloads. The "target state" of a workload is the target number of application instances 148 of a workload. Auto-scaling engine 138 then determines whether the number of application instances 148 should be increased or decreased to meet the target number of application instances 148 for each application. After determining whether to increase or decrease application instances 148 within computer system 100, auto-scaling engine 138 considers predictions made by prediction engine 144. Auto-scaling engine 138 adjusts the planned increase or decrease in application instances 148 in light of the forecasted demand by prediction engine 144. For example, if auto-scaling engine 138 determined that an increase in workload size for an application was warranted, but the prediction engine 144 predicted that demand for that application is about to decrease, then auto-scaling engine 138 might take no action in adjusting workload size of this application, or auto-scaling engine 138 might increase the number of application instances 148 for that workload by a smaller number.

At block 208, auto-scaling engine 138 provides a command to placement and migration engine 142 on the number of application instances 148 by which each workload in computer system 100 should be increased or decreased. Placement and migration engine 142 obtains data collected by monitoring engine at block 202 to decide at which data centers to create or delete the desired number of application instances 148 for the proper workloads.

At block 209, placement and migration engine 142 deletes any application instances 148 for any workloads that need to be decreased in size. Placement and migration engine 142 uses data collected by monitoring engine 136 to inform its decision as to which application instances 148 to delete. For example, placement and migration engine 142 might consider which application instances have low-usage or low-demand and so can be deleted, or which data centers 102 are overloaded and need to have resources freed by the deletion of application instances 148. For example, placement and migration engine 142 might prioritize deletion of application instances 148 determined to be unhealthy, such as unresponsive. In an embodiment, placement and migration engine 142 makes data-center-level decision as to which data center 102 should have application instances deleted, and leaves the choice as to which specific application instances 148 should be deleted to virtualization manager 130 of each data center 102.

At block 210, placement and migration engine 142 makes a decision regarding which data center 102 to place each newly created or to be created application instance 148. For each newly created or to be created application instance 148, placement and migration engine 144 runs a placement algorithm so as to place the application instance 148 into one of data centers 102. The placement algorithm is described by FIG. 3 below.

Figure 3:
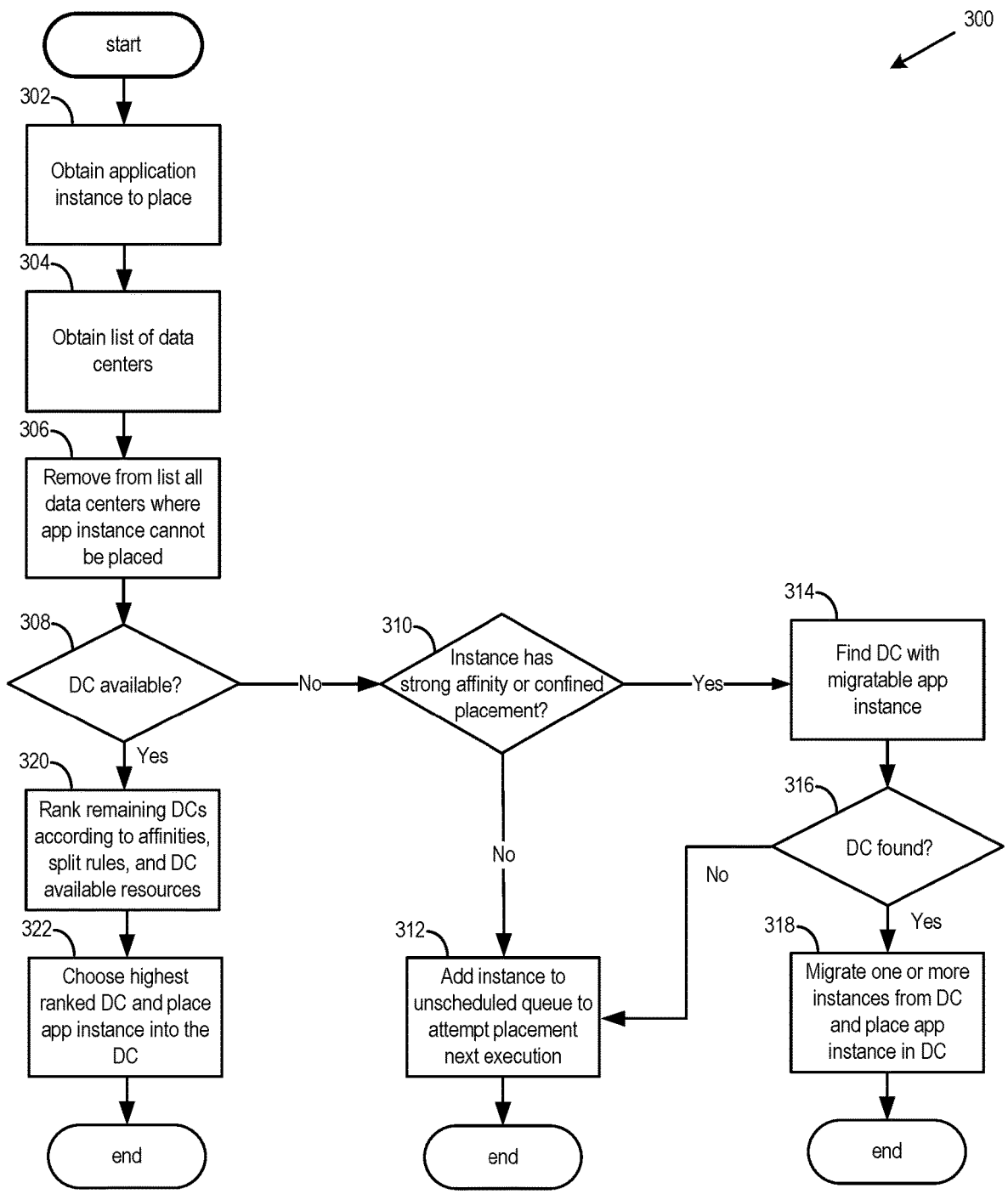
FIG. 3 depicts a flow diagram of a method of assigning application instances to a data center, according to an embodiment.

FIG. 3 depicts a flow diagram of a method 300 of assigning application instances 148 to a data center 102, according to an embodiment. Method 300 of FIG. 3 may be triggered by placement and migration engine 142 in block 210 of method 200 for each new application instance 148 of block 210. Method 300 may also be triggered by placement and migration engine 142 for each application instance 148 that has already been assigned to data center 102, but that has weak affinity to that data center 102, and could be reassigned to another data center 102 with a higher affinity. Method 300 may also be triggered periodically to attempt to schedule application instances 148 that were previously not able to be scheduled (see block 314, below). Affinity reflects the desired placement of application instance 148, as defined by a user/administrator, or as defined by efficiency of computer system 100.

At block 302, placement and migration engine 142 obtains the application instance 148 to be placed within one of data centers 102. Application instance 148 maybe a newly created application instance 148 that is yet to be placed, or application instance 148 may already be placed in one of data centers 102 with weak affinity, and it may be possible to place application instance 148 in another data center 102 with stronger affinity. Application instance 148 might not yet be created, in which case, placement and migration engine 142 obtains metadata of application instance 148 rather than application instance 148.

At block 304, placement and migration engine 142 obtains a list of data centers 102 within computer system 100. Placement and migration engine 142 may perform this by, for example, requesting a list of data centers 102 from monitoring engine 136.

At block 306, placement and migration engine 142 removes from the list of block 302 all data centers 102 onto which application instance 148 of block 302 cannot be placed. For example, if application instance 148 has a strong affinity to certain data centers 102, then all other data centers 102 are removed from the list. For another example, if application instance 148 has a confined split policy that requires application instance 148 to be on the same data center(s) 102 as other application instances 148 within the same workload, or requires application instance 148 to be placed on only certain data centers 102, then all other data centers 102 are removed from the list. For another example, placement and migration engine 142 might determine that certain data centers do not have enough resources to host an additional application instance 148, in which case, those data centers are also removed from the list.

At block 308, placement and migration engine 142 determines whether any data centers remain on the list. For example, it is possible that no data center 102 that is eligible to host application instance 148 has enough resources to host application instance 148. If no data center 102 remains on the list, then method 300 proceeds to block 310. Otherwise, method 300 proceeds to block 320.

At block 310, placement and migration engine 142 determines whether application instance 148 of block 302 must be placed in only certain data centers 102. As described above, it is possible that application instance 148 of block 302 must be placed in certain data centers 102 if the application instance 148 has a strong affinity to certain data center(s) 102, or if the split policy for the application instance 148 of block 302 confines the application instance 148 to certain data centers 102. If application instance 148 must be placed in only certain data centers 102, then placement and migration engine 142 makes another effort to place application instance 148 by continuing to block 314. Otherwise, method 300 proceeds to block 312.

At block 312, placement and migration engine 142 places application instance 148 of block 302 into a queue (not shown) for unscheduled application instances 148. Placement and migration engine 142 may periodically trigger method 300 for application instances 148 placed in the unscheduled queue. After block 314, method 300 ends.

At block 314, placement and migration engine 142 places determines whether it is possible to place application instance 148 in one of the certain data centers 102 to which application instance 148 is limited, as discussed at block 310 above. It could be possible to place application instance 148 into one of these data centers 102 by migrating another application instance 148 out of one of the certain data centers 102. The certain data centers 102 might contain application instances 148 with weak or medium affinity, and which can be migrated out, creating room for application instance 148 of block 302. If such migration out is possible, as determined at block 316, then method 300 proceeds to block 318. Otherwise, method 300 proceeds to block 312.

At block 318, placement and migration engine 142 migrates one or more migratable application instances from a data center 102 that can host application instance 148 of block 302. The migration may be performed by contacting virtualization manager 130 of the data center with a command to migrate out one of application instances 148 from the data center 102 of that virtualization manager 130. Placement and migration engine 142 then places application instances 148 of block 302 onto the data center from which an application instance was migrated out, and method 300 ends.

At block 320, placement and migration engine 142 ranks remaining data centers in the list according to various parameters of the workload specification (see Table 1) of application instance 148 of block 302. For example, placement and migration engine 142 may rank remaining data centers 102 according to available resources on that data center 102, according to affinity between application instance 148 and that data centers 102, according to split policy rules, or a combination of these and/or other workload specification parameters.

At block 322, placement and migration engine 142 chooses the most suited and best available data center 102 for placement of application instance 148. As part of block 322, placement and migration engine 142 places application instance 148 of block 302 into chosen data center 102. Placement of application instance 148 may be performed by notifying virtualization manager 130 of chosen data center 102 to create or migrate application instance 148 on chosen data center 102. As part of block 322, virtualization manager 130 assesses state of its local data center 102. Virtualization manager 130 determines which hosts 105 and which VCIs 120 should host newly created or newly migrated application instance 148, as per available resources on hosts 105 and VCIs 120. Virtualization manager 130 may instantiate new VCI 120 to accommodate application instance 148.

Returning to FIG. 2, at block 212, data collected at block 202 is provided by monitoring engine 136 as input to auto-healing engine 140. Additional input to auto-healing engine 140 may be health prediction data created at block 204 by prediction engine 144. Auto-healing engine 140 analyzes the collected data of block 202 to ascertain any unhealthy application instances 148. Some unhealthy instance might have been deleted as part of block 209. Auto-healing engine 140 then heals remaining unhealthy application instances 148. Auto-healing engine 140 also analyzes health prediction data of block 204 to ascertain application instances 148 that have not yet failed but are likely to fail soon. Auto-healing engine 140 then heals the application instances 148 that have not yet failed but are likely to fail. Auto-healing engine 140 heals application instance 148 by, for example, shutting down and restarting application instance 148, or by saving state of application instance 148, deleting application instance 148, creating new application instance 148, and applying the saved state to the newly created application instance 148. After block 212, method 200 ends.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, application specific integrated circuits (ASICs), field-programmable gate arrays (FPGAs), and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of managing an application workload on a computer system, the computer system comprising a plurality of data centers that includes a first data center and a second data center, the workload comprising a plurality of application instances, the plurality of application instances comprising first application instances running on the first data center and second application instances running on the second data center, the method comprising:
    collecting first data of the workload from the first data center and storing the first data on storage of the first data center, wherein the first data comprises usage data of first application instances;
    collecting second data of the workload from the second data center and storing the second data on storage of the second data center, wherein the second data comprises usage data of second application instances;
    combining the first data and second data into combined data;
    evaluating the combined data to determine presence of a low health indicator in at least one instance of the plurality of application instances, wherein the low health indicator comprises an indicator of unresponsiveness to protocol calls by the at least one instance;
    responsive to determining presence of the low health indicator, restarting the at least one instance or creating a first new application instance to replace the at least one instance;
    evaluating the combined data to determine whether to increase a size of the application workload, and determining whether to increase the size of the application workload;
    responsive to a determination to increase the size of the application workload, determining in which of the plurality of data centers of the computer system to place a second new application instance; and
    upon determining a chosen data center from among the plurality of data centers, contacting a component local to the chosen data center to place the second new application instance within a host machine of the chosen data center.

2. The method of claim 1, wherein the determining in which of the plurality of data centers to place the second new application instance comprises:
    obtaining a list of the data centers within the computer system;
    removing from the list one or more data centers onto which the second new application instance cannot be placed;
    ranking remaining data centers on the list according to parameters of the application workload; and
    choosing the data center to place the second new application instance from the ranked list.

3. The method of claim 1, the method further comprising:
    evaluating the combined data to predict future demand for the workload, and creating the predictions; and
    wherein the determining whether to increase the size of the application workload is at least partially based on evaluating the predictions.

4. The method of claim 1, wherein the combined data comprises data on resources used and available to hosts and virtual computing instances (VCIs) on the first data center.

5. The method of claim 1, the method further comprising evaluating the combined data and responsive to the evaluation, deleting at least one instance of the plurality of instances.

6. The method of claim 1, wherein the first data center is a software defined data center (SDDC).

7. A non-transitory computer readable medium comprising instructions to be executed in a processor of a computer system, the instructions when executed in the processor cause the computer system to carry out a method of managing an application workload on a computer system, the computer system comprising a plurality of data centers that includes a first data center and a second data center, the workload comprising a plurality of application instances, the plurality of application instances comprising first application instances running on the first data center and second application instances running on the second data center, the method comprising:

collecting first data of the workload from the first data center and storing the first data on storage of the first data center, wherein the first data comprises usage data of first application instances;

collecting second data of the workload from the second data center and storing the second data on storage of the second data center, wherein the second data comprises usage data of second application instances;

combining the first data and second data into combined data;

evaluating the combined data to determine presence of a low health indicator in at least one instance of the plurality of application instances, wherein the low health indicator comprises an indicator of unresponsiveness to protocol calls by the at least one instance;

responsive to determining presence of the low health indicator, restarting the at least one instance or creating a first new application instance to replace the at least one instance;

evaluating the combined data to determine whether to increase a size of the application workload, and determining whether to increase the size of the application workload;

responsive to a determination to increase the size of the application workload, determining in which of the plurality of data centers of the computer system to place a second new application instance; and upon determining a chosen data center from among the plurality of data centers, contacting a component local to the chosen data center to place the second new application instance within a host machine of the chosen data center.

8. The non-transitory computer readable medium of claim 7, wherein the determining in which of the plurality of data centers to place the second new application instance comprises:

obtaining a list of the data centers within the computer system;

removing from the list one or more data centers onto which the second new application instance cannot be placed;

ranking remaining data centers on the list according to parameters of the application workload; and choosing the data center to place the second new application instance from the ranked list.

9. The non-transitory computer readable medium of claim 7, the method further comprising:

evaluating the combined data to predict future demand for the workload, and creating the predictions; and wherein the determining whether to increase the size of the application workload is at least partially based on evaluating the predictions.

10. The non-transitory computer readable medium of claim 7, wherein the combined data comprises data on resources used and available to hosts and virtual computing instances (VCIs) on the first data center.

11. The non-transitory computer readable medium of claim 7, the method further comprising evaluating the combined data and responsive to the evaluation, deleting at least one instance of the plurality of instances.

12. The non-transitory computer readable medium of claim 7, wherein the first data center is a software defined data center (SDDC).

13. A computer system comprising:

a plurality of data centers that includes a first data center and a second data center;

a workload comprising a plurality of application instances, the plurality of application instances comprising first application instances running on the first data center and second application instances running on the second data center; and at least one processor, wherein the at least one processor is programmed to carry out a method of managing an application workload on the computer system, the method comprising:

collecting first data of the workload from the first data center and storing the first data on storage of the first data center, wherein the first data comprises usage data of the first application instances;

collecting second data of the workload from the second data center and storing the second data on storage of the second data center, wherein the second data comprises usage data of the second application instances;

combining the first data and second data into combined data;

evaluating the combined data to determine presence of a low health indicator in at least one instance of the plurality of application instances, wherein the low health indicator comprises an indicator of unresponsiveness to protocol calls by the at least one instance;

responsive to determining presence of the low health indicator, restarting the at least one instance or creating a first new application instance to replace the at least one instance;

evaluating the combined data to determine whether to increase a size of the application workload, and determining whether to increase the size of the application workload;

responsive to a determination to increase the size of the application workload, determining in which of the plurality of data centers of the computer system to place a second new application instance; and upon determining a chosen data center from among the plurality of data centers, contacting a component local to the chosen data center to place the second new application instance within a host machine of the chosen data center.

14. The computer system of claim 13, wherein the determining in which of the plurality of data centers to place the second new application instance comprises:

obtaining a list of the data centers within the computer system;

removing from the list one or more data centers onto which the second new application instance cannot be placed;

ranking remaining data centers on the list according to parameters of the application workload; and choosing the data center to place the second new application instance from the ranked list.

15. The computer system of claim 13, the method further comprising:

evaluating the combined data to predict future demand for the workload, and creating the predictions; and wherein the determining whether to increase the size of the application workload is at least partially based on evaluating the predictions.

16. The computer system of claim 13, wherein the combined data comprises data on resources used and available to hosts and virtual computing instances (VCIs) on the first data center.

17. The computer system of claim 13, the method further comprising evaluating the combined data and responsive to the evaluation, deleting at least one instance of the plurality of instances.

* * * * *